(12) United States Patent
Yamamoto

(10) Patent No.: US 7,917,021 B2
(45) Date of Patent: Mar. 29, 2011

(54) PORTABLE APPARATUS

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 183 days.

(21) Appl. No.: 12/202,533

(22) Filed: Sep. 2, 2008

(65) Prior Publication Data

US 2009/0060484 A1    Mar. 5, 2009

(30) Foreign Application Priority Data

Sep. 5, 2007  (JP) ................................. 2007-230107

(51) Int. Cl.
*G03B 17/00* (2006.01)
*H04N 5/228* (2006.01)

(52) U.S. Cl. .......... 396/52; 396/53; 396/54; 348/208.16

(58) Field of Classification Search ............... 396/52–55, 396/301, 302; 348/208.99, 208.1, 208.3, 348/208.12, 208.16
See application file for complete search history.

(56) References Cited

U.S. PATENT DOCUMENTS

| | | | |
|---|---|---|---|
| 5,184,216 A * | 2/1993 | Kobayashi | 348/207.99 |
| 7,352,389 B2 | 4/2008 | Uenaka | |
| 2002/0061189 A1 * | 5/2002 | Sato | 396/55 |
| 2005/0168585 A1 | 8/2005 | Uenaka et al. | |
| 2005/0270379 A1 | 12/2005 | Seo | |
| 2006/0083502 A1 * | 4/2006 | Higo | 396/55 |
| 2008/0013937 A1 | 1/2008 | Uenaka | |

FOREIGN PATENT DOCUMENTS

JP    9-127572 A    5/1997

OTHER PUBLICATIONS

English language Abstract and machine translation of JP 9-127572 A.

* cited by examiner

*Primary Examiner* — W. B. Perkey
*Assistant Examiner* — Minh Q Phan
(74) *Attorney, Agent, or Firm* — Greenblum & Bernstein, P.L.C.

(57) ABSTRACT

A portable apparatus, comprising a first detector, a second detector, and a controller, is provided. The portable apparatus has a photographing function. The first detector detects a movement in a first direction. The second detector detects a second direction. The second direction is different from the first direction. The controller switches the running and suspension of a first and second function according to the combination of movements in the first and second directions. The first and second functions are different from each other.

9 Claims, 4 Drawing Sheets

PORTABLE APPARATUS

BACKGROUND OF THE INVENTION

1. Field of the Invention

The present invention relates to a portable apparatus such as a digital camera and a portable telephone with a camera, said apparatus having various functions including a photographing function.

2. Description of the Related Art

A camera and a digital camera having various functions such as an anti-shake function are known. The running and suspension of the functions depend on the user's operation of a button or another input device. Such an operation may be tedious for the user. What is desired is a more convenient means of controlling the running and suspension of camera's function.

Japanese Unexamined Patent Publication No. 09-127572 proposes an anti-shake apparatus which enables an anti-shake function when the user looks in the viewfinder of the anti-shake apparatus. However, the anti-shake function can not always be enabled this way in recent digital still or video cameras because these are often operated using a monitor rather than a viewfinder. In addition, such means of enabling is inapplicable with functions which are incompatible with looking into the viewfinder.

SUMMARY OF THE INVENTION

Therefore, an object of the present invention is to provide a portable apparatus in which a function can be set to run or suspend without the need for a bothersome operation by the user.

According to the present invention, a portable apparatus, comprising a first detector, a second detector, and a controller, is provided. The portable apparatus has a photographing function. The first detector detects a movement in a first direction. The second detector detects a second direction. The second direction is different from the first direction. The controller switches the running and suspension of a first and second function according to the combination of movements in the first and second directions. The first and second functions are different from each other.

According to the present invention, a portable apparatus, comprising a first detector and a controller, is provided. The portable apparatus has a photographing function. The first detector detects a movement in a first direction. The controller switches the running and suspension of a first function when the first detector detects movement in the first direction.

According to the present invention, a portable apparatus, comprising a first detector, a second detector, and a controller, is provided. The portable apparatus has a photographing function. The first detector detects a movement in a first direction. The second detector detects a second direction. The second direction is different from the first direction. The controller orders the running and suspension of a first function when the first and second detectors detect the movement in the first and second directions, respectively.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
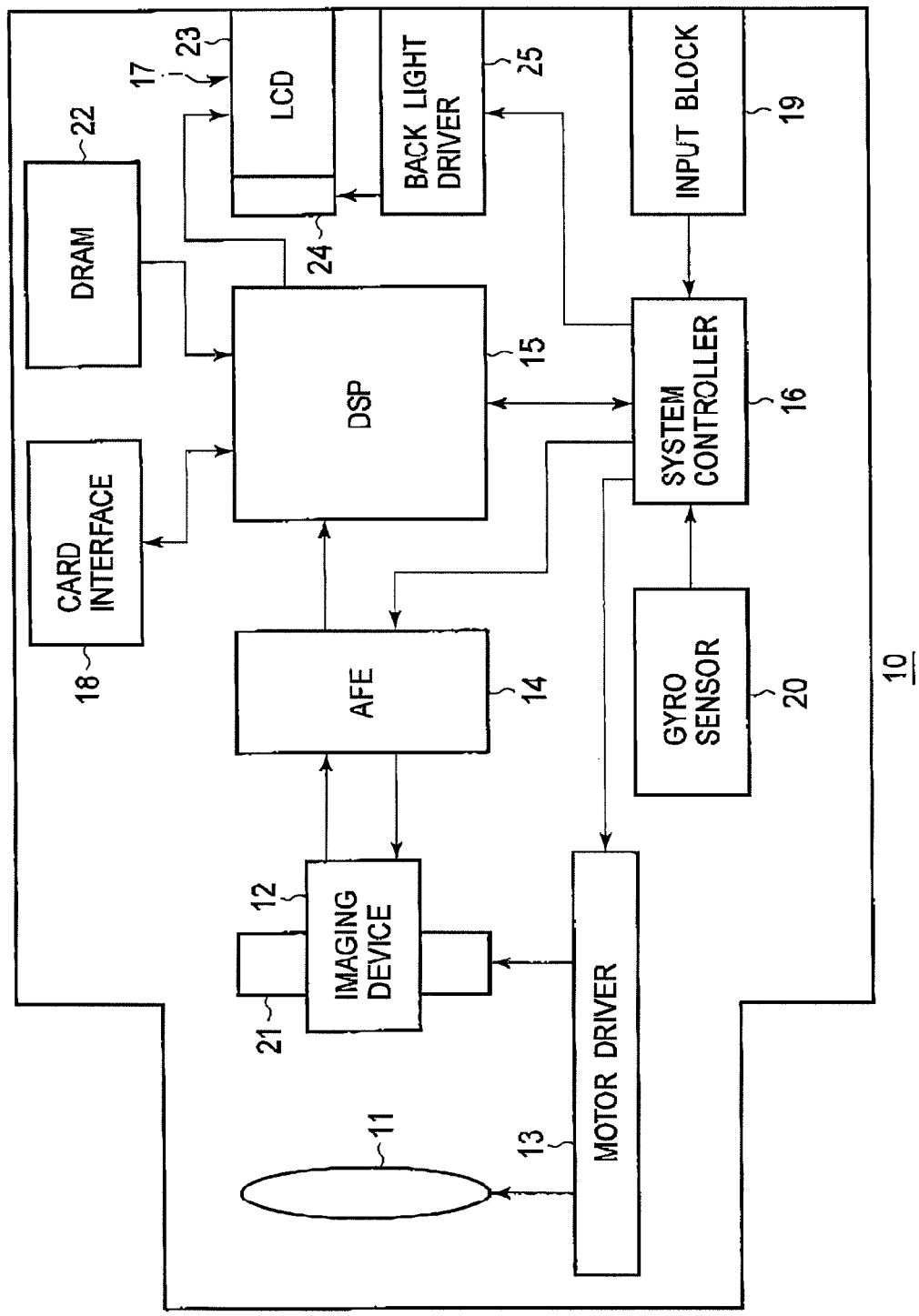
FIG. 1 is a block diagram showing the internal structure of a portable digital camera which is an embodiment of the present invention.

The present invention is described below with reference to the embodiment shown in the drawings.

In FIG. 1, a digital camera 10 (portable apparatus) comprises a photographic optical system 11, an imaging device 12, a motor driver 13, an analog front end (AFE) 14, a digital signal processor (DSP) 15 (distance detector), a system controller 16 (controller, determination block), a liquid crystal display (LCD) 17, a card interface 18, an input block 19, a gyro sensor 20 (first detector, second detector), and other components. The vertical direction in FIG. 1 is regarded as the vertical direction (first direction) of the digital camera 10 and the direction perpendicular to the plane of FIG. 1 is regards as the horizontal direction (second direction) of the digital camera 10.

The photographic optical system 11 is optically connected to the imaging device 12. An optical image of a subject through the photographic optical system 11 is incident on the light-receiving surface of the imaging device 12. The imaging device 12 is, for example, a CCD area sensor. When the imaging device 12 captures the optical image of the subject upon its light-receiving surface, the imaging device 12 generates an image signal corresponding to the captured optical image.

The photographic optical system 11 comprises a plurality of lenses, including a focusing lens (not depicted) and a zoom lens (not depicted). The focusing lens and the zoom lens are moved by a lens motor (not depicted) along the optical axis of the photographic optical system 11. The lens motor is driven by the motor driver 13.

The imaging device 12 is supported by an anti-shake mechanism 21 so that the imaging device 12 is movable on a plane perpendicular to the optical axis of the photographic optical system 11. The anti-shake mechanism 21 comprises an anti-shake motor (not depicted), which moves the imaging device 12 in two directions on the plane perpendicular to the optical axis of the photographic optical system 11. The anti-shake motor is driven by the motor driver 13.

The gyro sensor 20 is connected to the system controller 16. The gyro sensor 20 detects the motion vector of the digital camera 10 on the plane perpendicular to the optical axis direction. Vector data corresponding to the detected shake direction and the detected shake magnitude is sent to the system controller 16.

The system controller 16 calculates the direction and distance to move the imaging device 12 in order to cancel the shake. The data corresponding to the calculated direction and distance is sent to the motor driver 13. The motor driver 13 drives the anti-shake motor based on the received data, thereby canceling the shake of the imaging device 12 and its influence on the captured image. The anti-shake function (first function) is switched between the running and suspension based on the action described later.

The imaging device 12 is electrically connected to the DSP 15 via the AFE 14. A clock signal is sent from the DSP 15 to the AFE 14. The AFE 14 generates an imaging device driving signal for driving the imaging device 12 based on the received clock signal. The imaging device driving signal is sent to the imaging device 12. The imaging device 12, which is driven based on the imaging device driving signal, generates an image signal.

The generated image signal is sent to the AFE 14. The AFE 14 carries out correlated double sampling and gain adjustment on the image signal. In addition, the image signal is converted into digital image data and then sent to the DSP 15.

The DSP 15 is connected to a dynamic random access memory (DRAM) 22, which is used as a work memory for data processing. The image data received by the DSP 15 is temporarily stored in the DRAM 22. The DSP 15 carries out predetermined data processing on the image data stored in the DRAM 22.

The DSP 15 is connected to the LCD 17. The image data, having undergone predetermined data processing, is sent to the LCD 17. An image, corresponding to the image data received by the LCD 17 can thereby be displayed on the LCD 17.

The LCD 17 comprises a liquid crystal block 23 and a back light 24. The back light 24 shines illumination light over the entire back face of the liquid crystal block 23. The subject image corresponding to the image data is displayed on the LCD 17 by controlling the transmittance of illumination light at each pixel in the liquid crystal block 23 according to the received image data.

The intensity of light emitted by the back light 24 is controlled by a back light driver 25. The digital camera 10 has a power-saving function (second function). While suspending the power-saving function, the back light 24 is controlled to emit illumination light at a first light intensity. On the other hand, while running the power-saving function, the back light 24 is controlled to emit illumination light at a second light intensity, which is lower than the first.

The DSP 15 is connected to a card interface 18. When a release operation is carried out, the image data, having undergone predetermined data processing, is stored in a memory card (not depicted) which is connected to the card-interface 18.

The system controller 16 controls each component including the DSP 15 of the digital camera 10. The system controller 16 is connected to the input block 19 where the user inputs operational commands for handling the digital camera 10. The input block 19 comprises a release button (not depicted), a multi-functional cross-key (not depicted), and other buttons.

The digital camera 10 has an image capturing mode, a display mode, and a set-up mode. In the image capturing mode, the digital camera 10 can capture a still or moving image. In the display mode, a still or moving image captured previously can be displayed on the LCD 17. In the set-up mode, various user-adjustable parameters can be changed and some functions can be switched on or off.

While the release button is not depressed in the image capturing mode, the optical image incident on the imaging device 12 is captured every 1/30 second. The real-time moving image is displayed on the LCD 17 by renewing the displayed image every 1/30 second based on the image captured every 1/30 second.

When the release button is depressed, one frame of image data for a still image, or plural frames of image data for a moving image is stored in the memory card, and then image capture completes.

While the release button is not depressed in the image capturing mode, a motion vector is detected by the gyro sensor 19 or calculated, using the captured image. The motion vector includes a movement direction and a movement distance of the digital camera 10 on a plane perpendicular to the optical axis of the photographic optical system 11. While the anti-shake operation is executed, the gyro sensor 20 detects the motion vector. On the other hand, while the anti-shake function is suspended, the gyro sensor 20 is inactive, and the motion vector is calculated based on the successively captured optical images.

Figure 2:
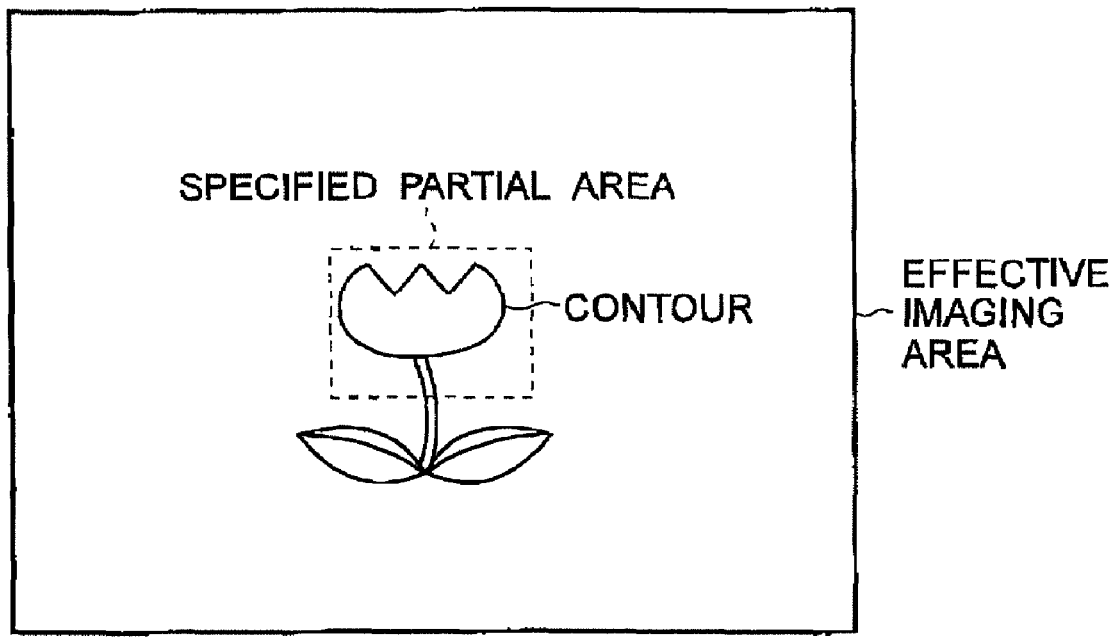
FIG. 2 is a diagram showing the location of a specified partial area in the effective imaging area.

The calculation of the motion vector based on the captured optical image is explained below. In order to calculate the motion vector, a pursuit process is carried out on the image data corresponding to an image captured at a specified partial area of the effective imaging area of the imaging device 12. In the pursuit process, as shown in FIG. 2, the contour of an subject captured in the specified partial area in the first frame soon after the pursuit process commences is detected using a type of feature extraction such as luminance extraction.

Figure 3:
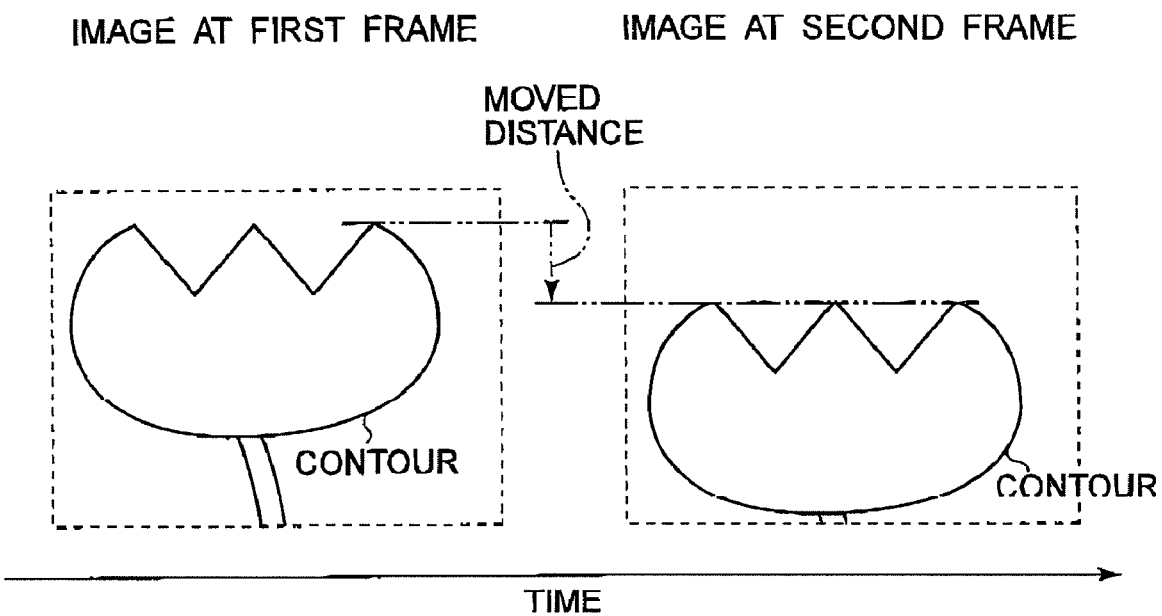
FIG. 3 is a diagram illustrating the pursuit process.

The DSP 15 determines the location to which the contour extracted in the first frame has moved in the second frame (see FIG. 3). The DSP 15 calculates the motion vector of the optical image of the pursued subject and treats it as the motion vector of the digital camera 10.

Movement velocities of the digital camera in the vertical and horizontal directions (hereinafter referred to as Vv and Vh) are calculated based on the vertical and horizontal components of the detected motion vector, respectively. It is determined whether or not each of Vv and Vh exceeds a threshold value, hereinafter referred to as V1. V1 is predetermined to be the accepted maximum possible velocity of a hand shake.

If Vv is more than V1, the system controller 16 determines that the vertical movement is not based on unintentional hand shake but rather a deliberate vertical movement, and the system controller 16 switches between the running and suspension of the anti shake function. If Vh is more than V1, the system controller 16 determines that the horizontal movement is not based on unintentional hand shake but rather a deliberate horizontal movement, and the system controller 16 switches between the running and suspension of the power-saving function.

The running and suspension of the anti-shake and the power-saving functions can also be switched in the set up mode. In addition, in the set-up mode, the function whose the running and suspension are switched when Vv is more then V1, is selectable from among other functions of the digital camera 10. In addition, in the set-up mode, the function whose the running and suspension are switched when Vh is more than V1, is selectable from among other functions of the digital camera 10.

Figure 4:
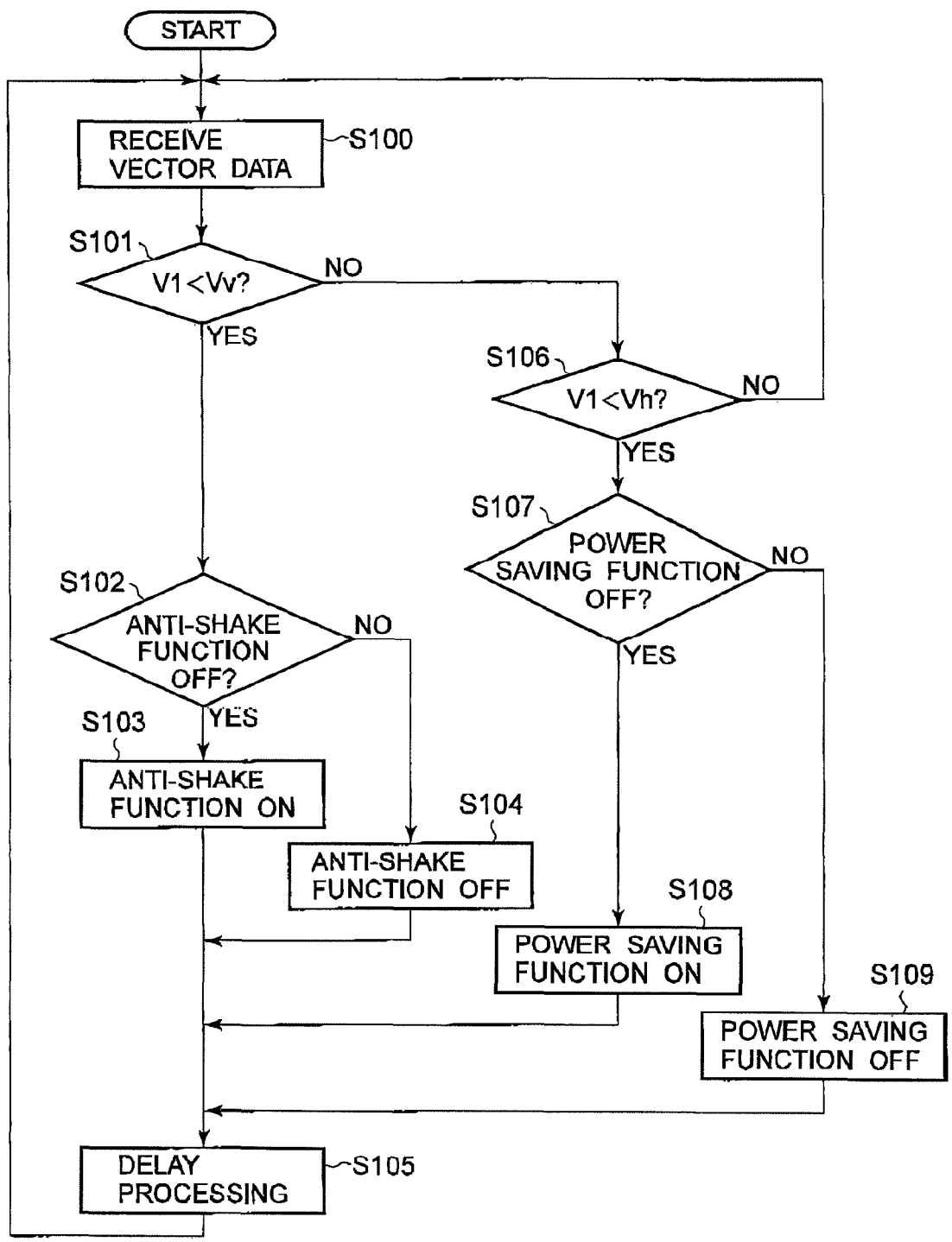
FIG. 4 is a flowchart illustrating the process used to switch between the running and suspension or the anti-shake and power-saving functions.

Next, the processes carried out by the system controller 16 to switch between the running and suspension of the functions are explained using the flowcharts of FIG. 4. FIG. 4 is a flowchart illustrating the process; to switch between the running and suspension of the anti-shake and power-saving functions.

The switching process commences when the digital camera 10 is switched on or when the operation mode of the digital camera 10 is switched to the image capturing mode. The process terminates when the digital camera 10 is switched off or when the operation mode of the digital camera 10 is switched to another mode.

At step S100, the system controller 16 receives the motion vector data. And, the system controller 16 calculates Vv and Vh based on the received motion vector data.

At step S101, it is determined whether or not Vv is more than V1. If Vv is more than V1, the process proceeds to step S102. On the other hand, if Vv is not more than V1, the process proceeds to step S106.

At step S102, it is determined whether or not the anti-shake function is suspended. If the anti-shake function is suspended, the process proceeds to step S103, where the anti-shake function is ordered to be run. On the other hand, if the anti-shake function is not suspended, the process proceeds to step S104, where the anti-shake function is ordered to be suspended.

After completion of step S103 or S104, the process proceeds to step 3105. At step S105, delay processing is carried out in which the advance to the next step is delayed for a predetermined time, such as two seconds. After completion of the delay processing, the process returns to step S100. The deliberate movement may continue after the system controller switches between the running and suspension of the function. Without the delay processing, the switching between the running and suspension would be repeated over and over during the deliberate movement.

As described above, if Vv is more than V1 at step S101, the process proceeds to step S106. At step S106, it is determined whether or not Vh is more than V1. If Vh is more than V1, the process proceeds to step S107. On the other hand, if Vh is not more than V1, the process returns to step S100.

At step S107, it is determined whether or not the power-saving function is stopped. If the power-saving function is stopped, the process proceeds to step S108, where the power-saving function is ordered to be executed. On the other hand, if the power-saving function is not stopped, the process proceeds to step S109, where the power-saving function is ordered to be stopped.

After completion of step S108 or S109, the process proceeds to step S105, where delay processing is carried out. After completion of the delay processing, the process returns to step S100.

In the above embodiment, the running and suspension of the predetermined functions, such as the anti-shake function, can be switched by movement in a predetermined direction, for example, by vertically shaking the digital camera 10. Accordingly, the user can switch the running and suspension of the predetermined functions without a tedious input operation.

The running and suspension of the predetermined functions are switched based on a deliberate vertical or horizontal movement by shake in the above embodiment. However, the running and suspension may be switched according to a combination of vertical and horizontal movements, such as a circular movement. Furthermore, it may be switched according to a combination of such combined movements in two directions.

The system controller 16 toggles between the running and suspension of the anti-shake and power-saving functions in the above embodiment. However, the running and suspension of function may be switched when the vertical and horizontal movements are detected, respectively.

The movement of the digital camera 10 is detected by the gyro sensor and calculated based on successively captured images in the above embodiment. However, the movement may be detected by just one of these methods.

The digital camera 10 comprises the LCD 17 to display a real-time moving image in the above embodiment. However, the digital camera 10 may comprise any other kind of monitor besides the LCD 17. The same effect as the above embodiment is achieved as long as the brightness of the entire image can be adjusted.

The digital camera 10 comprises the gyro sensor 20 for detecting the motion vector on a plane perpendicular to the optical axis direction in the above embodiment. However, the digital camera 20 may comprise a gyro sensor for detecting the acceleration in the optical axis direction in order to switch the running and suspension of another function. In the embodiment above, the gyro sensor can detect accelerations in two directions on a plane perpendicular to the optical axis direction for performing the anti-shake function and is also used for switching. Accordingly, in order to detect acceleration in a direction perpendicular to the optical axis direction, the digital camera 10 may comprise another gyro sensor used only for switching in addition to the gyro sensor for performing the anti-shake function.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2007-230107 (filed on Sep. 5, 2007), which is expressly incorporated herein, by reference, in its entirety.

What is claimed is:

1. A portable apparatus having a photographing function, said portable apparatus comprising:
   a first detector that detects a movement in a first direction;
   a second detector that detects a movement in a second direction which is different from said first direction; and
   a controller that switches between performance and suspension of a first and a second functions according to the combination of movements in said first and second directions detected by said first and second detectors, said first and second functions being different from each other, wherein
   said controller performs said first and second functions when first and second predetermined movements are detected when the first and second functions are suspended, respectively, said first and second predetermined movements being different from each other and are a combination of movements that include movements in the first and second directions, and wherein
   said controller suspends said first and second functions when said first and second predetermined movements are detected when said first and second functions are performed, respectively.

2. A portable apparatus according to claim 1, wherein said portable apparatus has a plurality of functions, and a single function can be selected as said first function from among said plurality of functions.

3. A portable apparatus according to claim 1, wherein said controller is configured to switch between performance and suspension of said first and second functions, respectively, without operation of a physical button or other dedicated user input device.

4. A portable apparatus having a photographing function, said portable apparatus comprising:
   a first detector that detects a movement in a first direction;
   a second detector that detects a movement in a second direction which is different from said first direction; and
   a controller that switches between performance and suspension of a first function when said first detector detects movement in said first direction and switches between performance and suspension of a second function when said second detector detects movement in said second direction, said first and second functions being different from each other, wherein
   said controller performs the first and second functions when said first and second detectors detect movement in said first and second directions when said first and second functions are suspended, respectively, and wherein
   said controller suspends the first and second functions when the first and second detectors detect movement in the first and second directions when the first and second functions are performed, respectively.

5. A portable apparatus according to claim 4, wherein said portable apparatus has a plurality functions, and a single function can be selected as said first function from among said plurality of functions.

6. A portable apparatus according to claim 4, further comprising a determiner that determines whether or not said movement in said first direction detected by said first detector is due to unintentional hand shake, said controller switching between performance and suspension of said first function when said determiner determines that said detected movement in said first direction is movement different from movement due to unintentional hand shake.

7. A portable apparatus according to claim 6, wherein said first detector detects a first velocity, said first velocity is velocity of said movement in said first direction, and said determiner determines that said movement in said first direction is movement different from movement due to unintentional hand shake when said first velocity exceed a threshold value.

8. A portable apparatus according to claim 7, wherein said first detector comprises an imaging device and a distance detector, said imaging device successively photographs at predetermined intervals, said distance detector detects the movement direction and movement distance of a partial image within two successive images, said partial image is a part of the entire image photographed by said imaging device, and said first detector detects said first velocity based on said movement direction and said movement distance.

9. A portable apparatus according to claim 4, wherein said controller is configured to switch between performance and suspension of said first and second functions, respectively, without operation of a physical button or other dedicated user input device.

* * * * *